United States Patent

[11] 3,633,012

[72] Inventors: Jack L. Wilhelmson, Fenton;
Bruce E. Michaels, Florissant, both of Mo.
[21] Appl. No.: 872,140
[22] Filed: Oct. 29, 1969
[45] Patented: Jan. 4, 1972
[73] Assignee: Sherwood Medical Industries, Inc.

[54] READ OUT SYSTEM
13 Claims, 4 Drawing Figs.

[52] U.S. Cl. .............................................. 235/151.3, 235/151.35, 318/600, 318/640, 356/96, 356/201
[51] Int. Cl. .................................................. G06g 7/04
[50] Field of Search ......................................... 356/74, 81, 98, 105, 102, 180, 186, 201; 235/184, 193, 197, 151.3, 151.35; 346/31, 32, 78, 141; 318/600, 640

[56] References Cited
UNITED STATES PATENTS

| | | | |
|---|---|---|---|
| 3,167,377 | 1/1965 | Pelavin | 356/181 X |
| 3,329,836 | 7/1967 | Pearlman et al. | 235/197 X |
| 3,377,467 | 4/1968 | Staunton et al. | 235/92 MT |

Primary Examiner—Malcolm A. Morrison
Assistant Examiner—R. Stephen Dildine, Jr.
Attorney—Hofgren, Wegner, Allen, Stellman & McCord

ABSTRACT: A servomechanism system coupled to a spectrophotometer provides direct and simultaneous read out of the transmittance, optical density, concentration and rate of chemical reaction of a solution being analyzed. To calculate rate of chemical reaction, a circuit differentiates an optical density signal modified by a circuit which selectably limits the maximum rate of change of the signal. Circuits associated with the servomechanism control as adjustable and dynamic deadband compensation network, and a detent or index means associated with the read out device to produce discrete readings from a continuously varying input.

READ OUT SYSTEM

This invention relates to a read out system, and more particularly to a system for reading out nonlinear related quantities.

The present invention is an improvement over the system disclosed in an application of W. H. Plumpe, Jr. and Theodore E. Weichselbaum, entitled "Read Out System," Ser. No. 710,161, filed Mar. 4, 1968, and now abandoned in favor of continuation application, Ser. No. 73,269 filed Sept. 17, 1970, assigned to the assignee of the present application, and referred to hereafter as the Plumpe system. The present system and the Plumpe system both provide direct read out of related quantities which must be calculated from input signals derived while analyzing chemical solutions. For example, a spectrophotometer is commonly used to provide a signal indicating the transmittance or transparency of a solution to light energy of a selected frequency. Previously, it was necessary to use tables and charts to convert the transmittance indication into other quantities useful in analyzing the solution, such as optical density or absorbance, concentration, and rate of chemical reaction.

In the Plumpe system, circuits were disclosed which automatically calculated all of these quantities, and provided an individual indication thereof. An operator could also enter information regarding known scale factors for a solution being tested in order to provide a direct reading of concentration or the like. The rate at which a chemical reaction was proceeding, such as the rate at which an enzyme was being used up by a solution, was also automatically calculated by a circuit which provided a continuous direct reading of the rate of chemical reaction. For additional information on prior systems and the Plumpe system, reference should be made to the above identified Plumpe et al. patent application.

The present invention is an improvement on the Plumpe system, and also provides new features not heretofore available in any read out system. To simplify and improve the accuracy of the circuit for calculating the rate of chemical reaction, the present system includes means for directly differentiating an optical density indication as modified by a selectable rate limit means which limits the maximum rate of change of the optical density signal. The selectable rate limit means eliminates capacitors and other devices which must store an electrical charge, thus being quickly resettable. The individual calculating circuits have been simplified, while increasing the accuracy of the final readings.

The present read out system also includes novel circuits providing new features not heretofore available. It is possible to obtain simultaneous readings of all quantities which can be calculated by the system, including the simultaneous read out of rate and optical density, and transmittance and optical density, neither of which was heretofore possible. The deadband of the servomechanism is adjustable. Also, dynamic deadband compensation automatically changes the response of the system to prevent system overshoot. When manually enabled, a digit align circuit automatically produces discrete output readings for a continuously variable input quantity. Additional circuits allow selection of the type and amount of braking near null for the servomechanism, and control other characteristics of the servomechanism.

One object of this invention is the provision of an improved system for reading out quantities which bear nonlinear relations to a quantity being measured.

One feature of this invention is the provision of a read out system for calculating the rate of chemical reaction by differentiating an optical density signal modified by response limiting circuits.

Another feature of this invention is the provision of a chemical analyzing system using an improved circuit for calculating the optical density of a solution, while allowing the simultaneous reading of rate of chemical reaction and other quantities.

Still another feature of this invention is the provision of a servomechanism having a manually adjustable deadband. The deadband is also automatically adjusted to optimize the response of the system for the particular characteristics of the signal driving the servomechanism.

Yet another feature of this invention is the provision of a read out system in which a servomechanism driven by a continuously variable input quantity includes means for producing discrete output quantity accurately representative of the continuously variable input quantity.

Further features and advantages of the invention will be apparent from the following description and from the drawings, in which.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated. Throughout the specification, values and type designations will be given for certain of the components in order to disclose a complete, operative embodiment of the invention. However, it should be understood that such values and type designations are merely representative and are not critical unless specifically so stated. The scope of the invention will be pointed out in the appended claims.

GENERAL OPERATION

Figure 1:
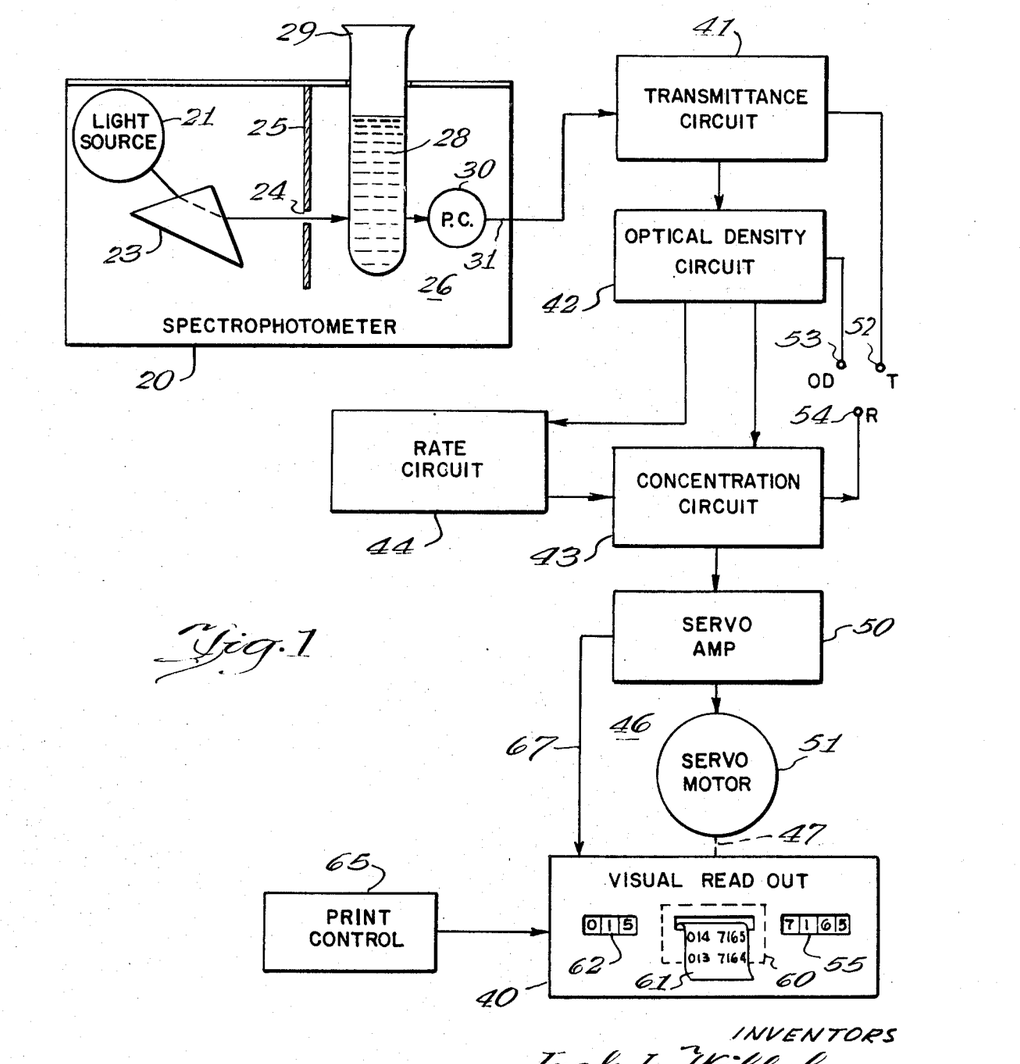
FIG. 1 is a block diagram of the read out system, as connected to a spectrophotometer.

In FIG. 1, the read out system is shown connected to the output of a conventional spectrophotometer 20. The spectrophotometer 20 typically includes a source 21 of light energy, which passes through a prism 23 and thence through an opening 24 in a wall 25 into a chamber 26. A solution 28 to be analyzed, contained within a transparent test tube 29, is lowered into the chamber 26 into the path of light energy which is directed from opening 24 toward a photocell (PC) 30. The output line 31 from photocell 30 carries a signal having an amplitude which depends on the absorbance of solution 28 to the particular frequency of light energy passing through opening 24.

As is well known, prism 23 may be manually rotated in order to pass different portions of the spectrum, i.e., different frequencies of light energy through opening 24, for passage through solution 28 before striking photocell 30. Different solutions have different degrees of absorbance for different frequencies of light energy. The reading from photocell 30 is normalized by controls (not illustrated) on spectrophotometer 20 which set a unit indication reading with no solution in test tube 29 or a blank solution containing all of the constitutents except the one to be measured, so that with the solution to be tested the amount of light energy reaching photocell 30 is proportionately less, and represents the transmittance T or transparency of the solution.

Several important quantities in common use in chemical analysis are determined from the transmittance of a solution, and have been read out by the Plumpe system previously described. Optical density OD, also called absorbance A, is the common logarithm of the reciprocal of transmittance, thus $$DD = \log_{10} 1/T$$

The concentration C of the solution may be determined by multiplying a method factor or a scale multiplier times the optical density of a solution. Finally, the rate of chemical reaction R, is equal to the rate of change of optical density.

A read out system is connected to spectrophotometer 20 to provide a direct read out of any of these quantities on any suitable visual read out device 40, which may provide digital or analog representations. The read out system includes a transmittance circuit 41 connected to the output line 31 from photocell 30, and an optical density circuit 42, a concentration circuit 43 and a rate circuit 44 which perform calculations in accordance with the signals from circuit 41. These circuits provide signals which drive a servomechanism 46 having an output movement at a shaft 47 coupled to visual read out device 40. Servomechanism 46 includes a servoamplifier 50 which drives a servomotor 51 to provide a shaft rotation directly proportional to the desired quantity to be read out. The functions performed by the above described units were generally performed by similar units in the Plumpe system.

In accordance with the present invention, all units have been improved and utilize new circuits and components to both simplify the unit and to improve its accuracy. In addition, many functions and operations not previously available are provided by these units, as will appear. As only one example, circuits 41 and 42 include separate terminals 52 and 53 at which the transmittance T and optical density OD signals, respectively, are always available, and a terminal 54 connected via circuit 43 to circuit 44 to also provide a rate of chemical reaction R signal. In the Plumpe system, due to different circuits 41, 42 and 44, it was not possible to simultaneously calculate the optical density OD and rate R or transmittance T signals. The present system allows all three signals to be simultaneously read out. They may, for example, be coupled to an analog-to-digital converter and then to the input of a digital computer in order to allow simultaneous calculations to occur, as may be desired when analyzing certain solutions.

Any read out system 40 is suitable for use with the system which can convert the movement of a shaft into a corresponding reading or indication for either temporary or permanent recordation. A suitable visual read out device 40 is the apparatus disclosed in a copending application of William H. Plumpe, Jr. and Theodore E. Weichselbaum, entitled "Printing Apparatus," Ser. No. 702,581, filed Feb. 2, 1968, now U.S. Pat. No. 3,547,028 and assigned to the assignee of the present invention, to which reference should be made for a full explanation. In such a case, servomotor 51 may directly replace the servomotor in this copending application, which drives recording indicators. These indicators include an indicator 55 having discrete digital readings which can be observed through a window in the device 40, and a print mechanism 60 which prints a permanent record on a recording medium 61. An additional indicator 62 records a separate number for each or a related group of print operations, in order to aid an operator in logging the test result.

Device 40 may be controlled by any suitable print control 65, which provides signals for sequencing of the printer, the logging indicator 62, and the like. In addition, print control 65 may energize a detent device, such as disclosed in the identified copending application on the printing apparatus, which detents indicator 55 and the print indicator (not illustrated) in mechanism 60 to whole digital values. In accordance with the present invention, servoamplifier 50 includes an additional circuit generating a signal, on an output line 67, which connects with device 40 to also control the detent device.

GENERAL DESCRIPTION OF THE READ OUT SYSTEM

The read out system of FIG. 1 is shown in detail in the remaining drawings. The transmittance circuit 41, seen in FIG. 2, includes a first stage amplifier 70 connected to photocell 30 to convert the current from photocell 30 into a voltage representing transmittance. The voltage is amplified by a second stage amplifier 72 to produce a transmittance output T available either across a terminal 74 or a terminal 75 of a single-pole, double-throw switch 76. Contact 74 is used when the transmittance range is from 0 to 10 percent T, and the contact 75 is used when the transmittance range is from 10 percent to 100 percent T.

Figure 2:
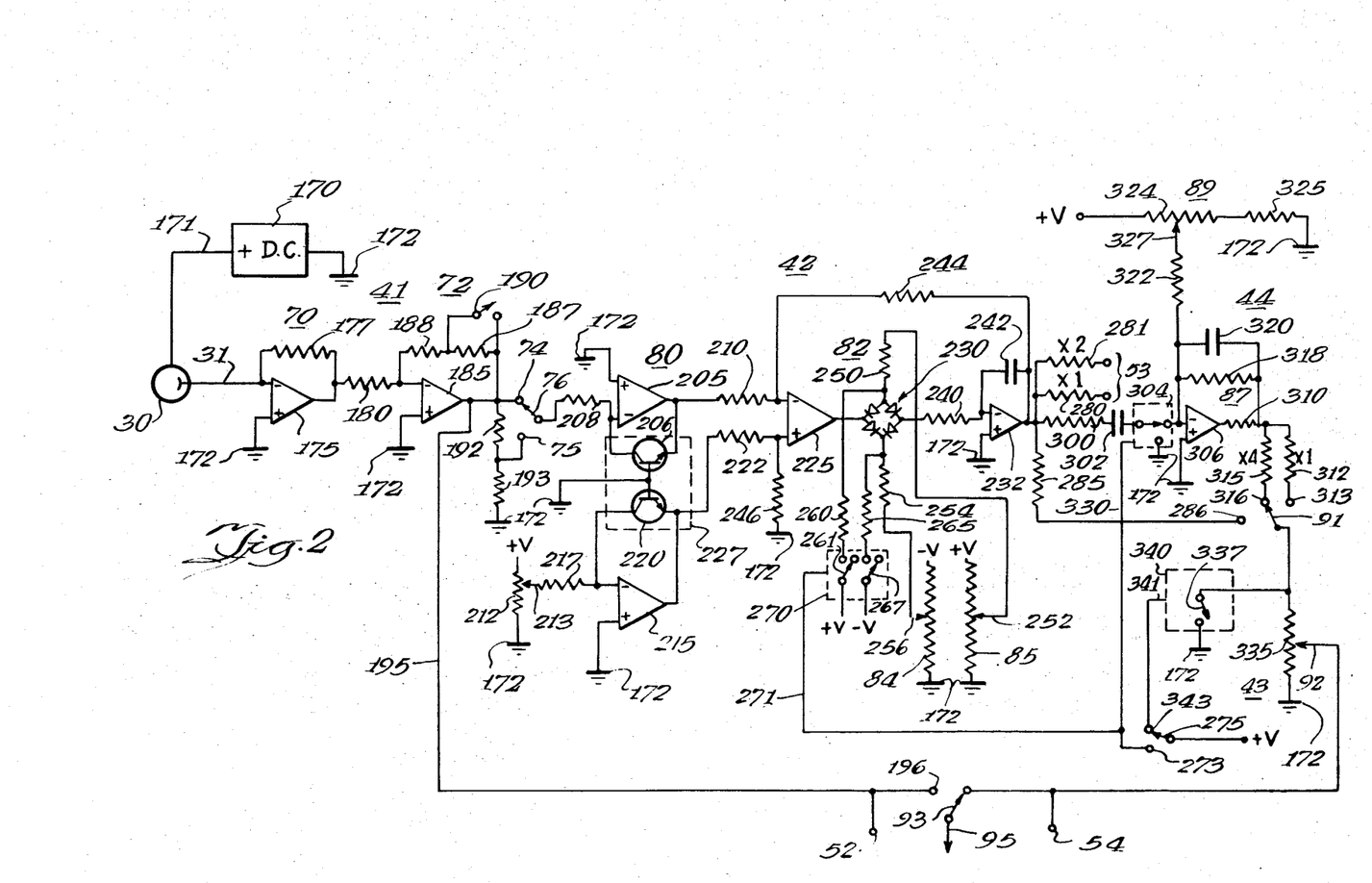
FIG. 2 is a schematic diagram of the transmittance circuit, the optical density circuit, the rate circuit, and the concentration circuit shown in FIG. 1.

The optical density circuit 42, connected to the wiper of switch 76, includes an absorbance amplifier consisting of a logarithmic converter 80 coupled to a rate-limit amplifier 82. The output from amplifier 82 is an optical density OD or absorbance signal, available across terminals 53. Logarithmic converter 80 serves to convert the transmittance reading into an optical density reading. The output of the converter 80 is
$OD = \log_{10} 1/T$ The OD signal, which is temperature compensated, is coupled to the rate-limit amplifier 82.

Rate-limit amplifier 82 includes a pair of potentiometers 84 and 85 which are adjustable to select the maximum rate of change of optical density which is permitted to pass through the amplifier. If the actual rate of change of OD exceeds the limit, the amplifier 82 limits the output signal, to terminals 53 and the remaining portions of the circuit, from rising faster than the maximum limit, introducing a time lag in the response. Such operation is especially desirable when the system is calculating rate of chemical reaction, because noise and other transient conditions could otherwise create violent changes in the output reading.

In operation, potentiometers 84 and 85 are adjusted to a value just exceeding the expected rate of change of whatever quantity is being read out by the system, thereby masking out the effects of noise. In addition, an operator may analyze both low- and high-frequency components of the quantity being analyzed, by appropriate adjustment of potentiometers 84 and 85. The output from amplifier 82 is coupled to terminals 53 and to the rate circuit 44.

Rate circuit 44, FIG. 2, includes a differentiator 87 which is coupled to amplifier 82 to time differentiate the optical density signal. Time differential of optical density is the rate of chemical reaction. The calculated rate may be offset by adjustment of a blank rate offset control 89, which causes a selected amount of rate to be subtracted from the rate of change of optical density. As is well known, a chemical reaction may proceed without a catalyst at a rate of chemical activity which desirably should be subtracted from the rate with a catalyst, to determine the effect of the catalyst on the solution. Control 89 subtracts or blanks out such a rate of chemical activity, reducing the rate reading by the fixed amount selected by an operator.

The rate output from differentiator 87 and the optical density output from amplifier 82 are coupled to a switch 91 for connecting one of the outputs to concentration control 43. When switch 91 is coupled to the OD output from amplifier 82, control 43 may be manually adjusted to set known multiplication factors of from approximately 0 to times 3 or the like for the particular solution being analyzed, so that an output line 92 from control 43 will carry a signal which directly indicates concentration. When other quantities than concentration are to be read, control 43 is set at a scale factor or multiplier of one, and thus has no effect on the output signal on line 92. For example, if both rate of chemical reaction and optical density are to be simultaneously read, control 43 is set at a scale multiplier of one and switch 91 is connected to differentiator 44, so that the R signal is available on terminal 54, and the OD signal is available on terminal 53.

Figure 3:
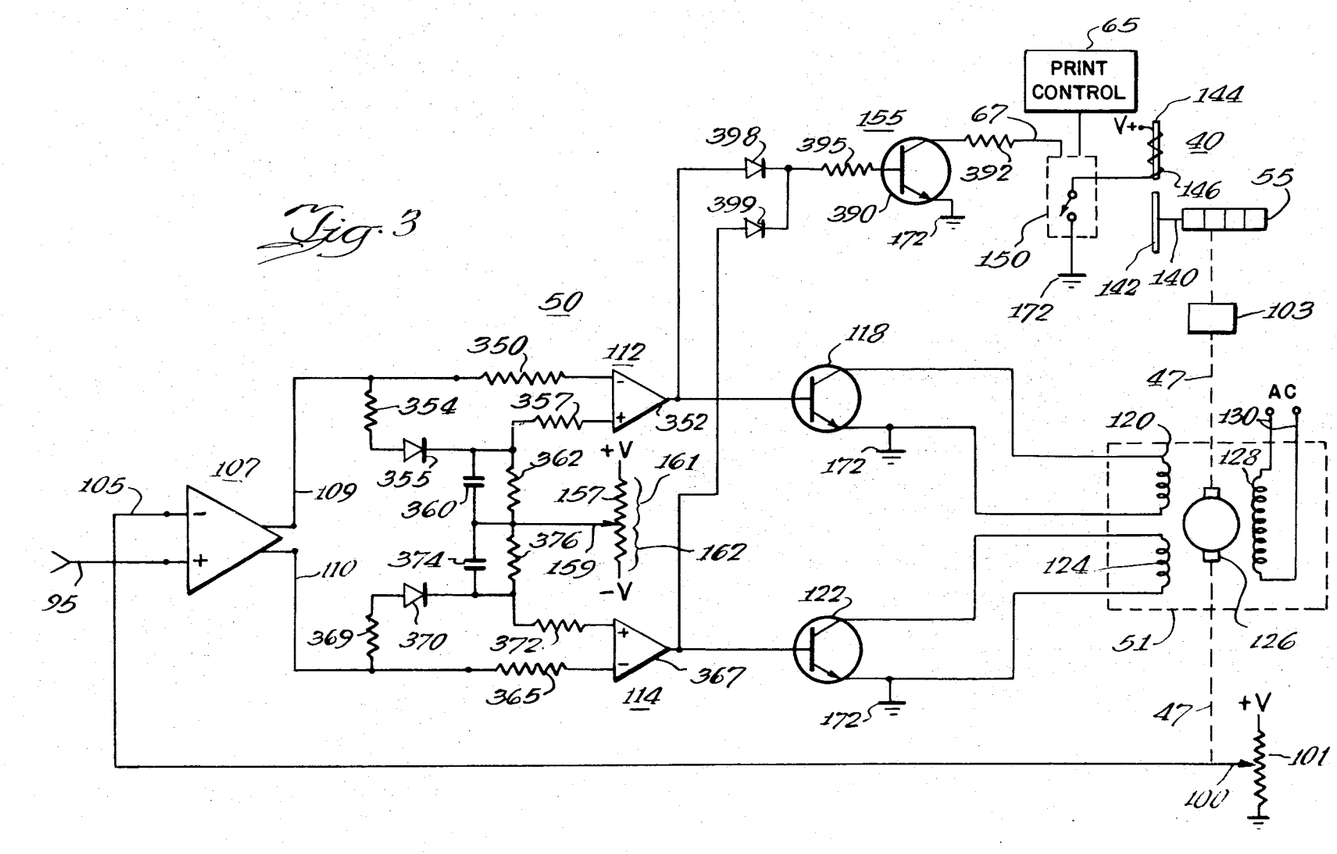
FIG. 3 is a schematic diagram of the servoamplifier of FIG. 1, and includes portions of other units connected thereto.

Output line 92 from concentration control 43 is coupled to a switch 93 for connecting either line 92 or the output from transmittance amplifier 72 to a line 95 which serves as the input of servoamplifier 50, seen in FIG. 3. Depending on the setting of control 43 and the location of switches 91 and 93, the signal to servoamplifier 50 may be the transmittance T, optical density OD, or rate R. Servoamplifier 50 responsive to the signal on line 95, energizes motor 51 and causes it to rotate in a direction which through shaft 47 moves a wiper 100 of a feedback potentiometer 101 to a mechanical position which, at null, corresponds to the amplitude value of the signal on line 95. Shaft 47 is also connected through a gear train 103 to visual indicator 55, which visually records the total amount of shaft rotation, and hence the value of the signal input on line 95.

To cause the servomechanism to null, the feedback potentiometer resistance is coupled across a DC source, and the resulting voltage at wiper 100 is coupled over a line 105 to one input of a differential amplifier 107, the other input thereto being the driving signal on line 95. Amplifier 107 is responsive to the voltage difference between the signals on line 95 and line 105 to produce a pair of signals, of equal absolute magnitude and opposite polarity, each coupled to one of a pair of output lines 109 and 110. Amplifier 107 drives a pair of differential stages 112 and 114, connected to lines 109 and 110, respectively. Each stage is connected to form a switching circuit driven between on or off conduction states depending on the polarity of the signal input on its line 109 or 110. Stage 112 includes a transistor 118, which when forward biased, shorts a shading coil 120 of motor 51. Similarly, stage 114 includes a transistor 122 which, when forward biased, shorts a shading coil 124 of motor 51.

Motor 51 is of the bidirectional, shaded pole type, having an armature 126 and an AC field winding 128 continuously connected across a source 130 of AC voltage. When shading coil 120, for example, is shorted by transistor 118, armature 126 rotates in one direction at full speed. Conversely, when shading coil 124 is shorted by transistor 122, armature 126 rotates at full speed in the opposite direction. To control motor speed in the same manner as explained in the before identified Plumpe application, Ser. No. 710,161, the shading coil corresponding to a desired direction of rotation is continuously shorted, while the opposite shading coil is at times shorted in order to introduce a reverse or braking component which slows the rotation of armature 126 to less than full speed.

When there is no signal at drive input 95, wiper 100 is driven to an end position for potentiometer 101, corresponding to 0 volts. As the signal on drive input 95 increases from 0 volts, the servomechanism responds to the voltage unbalance detected at amplifier 107 by shorting the shading coils to rotate armature 126 and wiper 100 in a direction to increase the voltage on the wiper, until it equals the voltage to drive input 95. Since shaft 47 is also coupled, via a gear train 103, to indicator 55, a direct reading of the selected quantity is displayed at this time.

Visual indicator 55 in read out device 40 may be of the type in the before identified copending application "Printing Apparatus," and consist of individual indicia wheels, each carrying numbers from 0 through 9, which include interconnected gearing means of the well known type, such as utilized in speedometers or the like, so that ten incremental advances of the wheel representing the lowest digit causes one incremental advance of the next adjacent wheel, and 100 incremental advances of the next adjacent wheel, and 100 incremental advances of the lowest digit wheel causes one incremental advance of the further adjacent wheel, and so on.

The lowest digit wheel is affixed to and rotates on a shaft 140 which is affixed to a detent device, which may be of any desired type. For example, it may consist of the type disclosed in the before identified application "Printing Apparatus," in which a toothed wheel 142 is disposed adjacent a magnetizable core 144 having a winding 146 wound therearound. The electromagnet coil 146 is energized by activating an electronic switch 150, shown in detail in FIG. 4 along with the specific magnetic detent, attracting the nearest tooth of wheel 142 and orienting the lowest integer or units wheel to the nearest whole number. In the past, detenting has been accomplished by print control 65 generating a signal which activates switch 150 to energize the magnetic detent when printing is to occur.

In accordance with the present invention, the detent device is also energized automatically as the servomechanism approaches its null position, independent of the operation of print control 65. For this purpose, stages 112 and 114 of servoamplifier 50 are coupled to a logic network 155 which, when activated, couples a signal over line 67 to activate switch 150 and thus energize the magnetic detent. Logic network 155 is controlled by a master potentiometer 157 in servoamplifier 50, consisting of a wiper 159 movable over a first resistance section 161 on a second resistance section 162. When wiper 159 is located on one resistance section, logic network 155 is activated when the servomechanism is near and at null, causing the servomechanism to automatically "round off" to the nearest whole number. When wiper 159 is located on the other resistance section, logic network 155 is not activated as the servomechanism approaches or is at the null position, allowing the wheels forming indicator 55 to assume whatever position the gearing 103 and shaft 47 assumes, including a position in between whole integers, so that the operator can himself interpolate the reading.

Master potentiometer 157 also adjusts the deadband of the servomechanism. When wiper 159 is located at the junction or zero position between resistance sections 161 and 162, the servomechanism has a minimum deadband, that is, the slightest voltage on input 95 will cause resulting movement of armature 126. To require a greater voltage at drive input 95 to cause servomovement, wiper 159 is moved, in either direction, away from the zero position (the direction of movement being determined by whether or not the digit align circuit is to be actuated). The amount of absolute wiper movement away from midposition determines the deadband of the servomechanism, and the speed that the servo approaches null.

The components in servoamplifier 50 are adjusted experimentally to match the mechanical characteristics of the servomechanism and attached load, such as printer 40, to cause the system to achieve a critically damped response to a step input at drive line 95. Potentiometer 157 is connected in a circuit which automatically modifies the selected deadband of the servomechanism, so that the speed at which the system approaches null depends upon the magnitude of the input signal with reference to the feedback signal.

The read out system uses several conventional operational amplifiers, illustrated in the drawings by triangles. Each operational amplifier has a pair of input lines thereto, one of which is designated (−), and the other of which is designated (+). The output from the operational amplifier is a voltage proportional to the difference between the voltages on the (−) and (+) inputs thereto. Each operational amplifier has a high gain and an extremely high input impedance, which allow input and feedback elements to determine circuit characteristics. While operational amplifiers are disclosed, other differential devices having an output signal proportional to the difference between a pair of input signals could be substituted for the operational amplifiers.

To simplify the drawings, a number of conventional elements have not been illustrated. For example, known "bounding circuits" for high-frequency rolloff for an operational amplifier are deleted. Other conventional elements for temperature compensation, adjustable gain, and the like are similarly omitted, and only those elements critical to the invention are disclosed herein. All such known elements may be added to the servomechanism, as desired.

TRANSMITTANCE CIRCUIT 41 AND

OPTICAL DENSITY CIRCUIT 42

In FIG. 2, the circuits 41 and 42 for calculating both transmittance T and optical density OD or absorbance from the signal from photocell 30 will now be described in detail. The voltage for photocell 30, as well as for the remaining portions of the system, is provided by a DC power supply 170 having a positive output voltage on line 171, and a negative output voltage connected to a source of reference potential or ground 172. Supply 170 may be of conventional regulated form, and may have a plurality of other output DC voltages.

As photocell 30 is exposed to more light, the current on line 31 increases to the first stage transmittance amplifier 70, connected as a current-to-voltage converter. Stage 70 includes an operational amplifier 175 having its (−) input connected to line 31, and its (+) input connected to ground 172. A 10-megohm resistor 177 is connected between the output line from amplifier 175 and the (−) input. The resulting output voltage to a 10-kilohm resistor 180 is 1 volt for each 100 nanoamperes of input current on line 31. Converter stage 70 may include additional components for compensating for the dark current from photocell 30, and for maintaining the amount of voltage across the photocell at a constant value, even though the current from the photocell varies. Such a circuit, for example, is shown in the copending application on the Plumpe system, and is not a part of the present invention.

Amplifier 72 forms the second stage of the transmittance circuit 41, and includes an operational amplifier 185 having its (−) input connected to resistor 180 and its (+) input connected to ground 172. To provide gain adjust, a feedback network consists of a 300-kilohm resistor 187 and a 100-kilohm resistor 188 connected in series between the output of amplifier 185 and the (−) input. Resistor 187 is shunted by a single-pole, single-throw switch 190. When switch 190 is in its open position, the gain is greatest, and when switch 190 is closed to shunt resistor 187, the gain is lowest. The output from amplifier 187 is connected to terminal 74 of switch 76, and is also coupled to a 9-kilohm resistor 192 and a 1-kilohm resistor 193 connected in series to ground 172. Terminal 75 is connected to the junction between resistors 192 and 193 so that when wiper 76 is located on terminal 74, a 0 to 10 percent transmittance range is provided, and when wiper 76 is located on terminal 75, a 10 to 100 percent transmittance range is provided. The terminal 74 is also coupled via a line 195 to terminal 52 and to a terminal 196 for switch 93, thus allowing the transmittance reading to be directly connected through switch 93 to the servomechanism.

Optical density or absorbance is calculated by logarithmic converter 80 and rate-limiter 82, connected in cascade. Converter 80 consists of an operational amplifier 205 having a feedback transistor 206. The (−) input of amplifier 205 is connected through a 100-kilohm resistor 208 to the wiper of switch 76, and also is coupled to the collector of NPN-transistor 206. The emitter of the transistor is directly coupled to the output of amplifier 205, and the base electrode of the transistor is directly coupled to ground 172. The (+) input of amplifier 205 is also coupled to ground 172.

In operation, operational amplifier 205 and transistor 206 operate in a known manner to form a logarithmic amplifier, producing an output voltage coupled to a 2-kilohm resistor 210, which is the logarithm of the input signal. Desirably, the logarithmic feedback element, herein transistor 206, is a minority carrier device, rather than a majority carrier device such as semiconductor diode. In such a case, the output voltage accurately equals the logarithm of the input current plus a constant. It is known that in logarithmic amplifiers of this type, an offset voltage must be subtracted from the output voltage to produce a pure logarithmic curve. For this purpose, a potentiometer 212 is connected between a source of positive DC voltage, labeled +V, and ground 172. The wiper 213 of potentiometer 212 is initially set at approximately the 1 volt level. In accordance with the present invention, the bias offset is not coupled to the (+) input of operational amplifier 205, in order to subtract from the output, but rather is connected in a special circuit which both offsets bias and accurately temperature compensates the converter 80.

To perform these operations, bias potentiometer 212 is connected to another logarithmic amplifier, consisting of an operational amplifier 215 whose (−) input is connected through a 100-kilohm resistor 217 to the wiper 213, and whose (+) input is connected to ground 172. The output and (−) input of amplifier 15 are connected to the emitter and collector electrodes, respectively, of another NPN-transistor 220. The base of transistor 220 is directly coupled to ground 172. The output from amplifier 215 is coupled through a 2-kilohm resistor 222 to the (+) input of an operational amplifier 225, which also is used in rate-limiter 82. The (−) input of amplifier 225 is coupled to resistor 210 connected to the logarithmic converter 205. Transistors 206 and 220 are matched units contained on a single thermally conducting substrate 227, and can be obtained as a common temperature controlled pair of transistors with matched characteristics.

In operation, the amount of offset, selected by potentiometer 212, is subtracted from the logarithm of transmittance by the subtraction operation performed by operational amplifier 225. As the ambient temperature varies, the outputs of the pair of logarithmic amplifiers 205 and 215 will vary. The bias logarithmic amplifier 215 output varies in exactly the same manner due to temperature effects as does the output of the transmittance logarithmic amplifier 205, due to transistors 206 and 220 temperature tracking in exactly the same manner. All variations in the log signal to the (+) input of amplifier 225 is caused by the effect of temperature, and is an exact duplicate of the effect of temperature on the log signal to the (−) input of amplifier 225. Amplifier 225 subtracts these log signals, producing an output which represents only the logarithm of the transmittance signal, which in turn is the optical density OD signal.

Rate-limiter 82 allows selection of the maximum rate of change of the logarithmic transmittance signal from amplifier 80. This reduces the deleterious effect of noise impulses coupled through amplifier 80. The circuit for rate limiting includes an operational amplifier 225, four diodes connected in a diode gate configuration 230, and an operational amplifier 232, interconnected with potentiometers 84 and 85. The output from amplifier 225 is connected to one junction point in gate 230, the opposite junction being connected through a resistor 240 to the (−) input of operational amplifier 232. The (+) input of amplifier 232 is directly connected to ground 172, and amplifier 232 includes a feedback element in the form of a capacitor 242 connected between the output and the (−) input. The output is also coupled through a 2,100-kilohm feedback resistor 244 to the (−) input of amplifier 225. The (+) input of amplifier 225 is also coupled through a 200-kilohm resistor 246 to ground 172.

The pair of junction points in diode gate 230, opposite the junction points connected to amplifier 225 and resistor 240, are connected to sources of positive and negative DC voltage. One junction is connected through a resistor 250 to a wiper 252 on potentiometer resistance 85, connected between a source of positive voltage +V and ground 172. The opposite junction is connected through a resistor 254 to a wiper 256 on potentiometer resistance 84, connected between a source of negative voltage −V and ground 172. For resetting the rate-limiter, as will appear, the junction connected to resistor 250 is also coupled through a resistor 260 and a single-pole, single-throw switch 261 to +V voltage. Similarly, the junction connected to resistor 254 is connected through a resistor 265 and single-pole, single-throw switch 267 to −V voltage. The pair of switches 261 and 267 may be part of an electronic switch 270 actuated by a (+) voltage on a line 271 which connects to a terminal 273 on a push button switch 275 having a wiper connected with (+) voltage.

The above described circuit, absent the reset portion to be described later, forms a known type of rate-limiter in which the output voltage from operational amplifier 232 is approximately equal and of opposite polarity to the input voltage to operational amplifier 225. In circuits of this type, it is known that the rate limit, in volts per second rise time, is directly proportional to the voltage across the diode gate 230, divided by the sum of the resistance values of one of equal resistors 250 and 254 and resistor 240, multiplied by the capacitance of capacitor 242. The voltage across the gate 230 in turn is directly proportional to the position of wipers 252 and 256 of potentiometers 84 and 85.

Wipers 252 and 256 allow an operator to select the maximum rate limit or rate of change of the optical density signal. The calibration of maximum rate of change may be made directly on a dial ganged to wipers 252 and 256. A maximum rate limit is selected which just exceeds the maximum rate of change of optical density known to occur for the type of solution and reaction being analyzed. In the case of an unknown reaction, the greatest maximum rate limit is selected. Of course, the selection of lower rate limits is desirable in that it eliminates all noise effects having a greater rate of change.

To reset the read out system in order to begin a new reading, switch 275 is actuated, thereby connecting +V to terminal 273. Insofar as it affects the rate-limiter 282, the voltage coupled via line 271 actuates electronic switch 270, causing the pair of switches 261 and 267 therein to close. Electronic switch 270 may be any known type of time delay circuit in which a pair of single-pole, single-throw switches are held for 3 seconds upon actuation by +V voltage being coupled to control line 271. After a 3-second time delay, the switches return to their normally open positions. In the reset circuit, the closure of switches 261 and 267 connects the full +V and −V voltage across the diode bridge 230, thus setting the greatest maximum rate limit.

Rate-limiter 82 is an improvement on the type of rate-limiter disclosed in the Plumpe system, which consists of a plurality of capacitors, only one of which is selected at a time, connected to the input of the current-to-voltage converter in the transmittance amplifier. The elimination of capacitors eliminates the time delay necessary to charge the capacitors, which in turn limits the time of response of the read out system.

The output from operational amplifier 232 is the optical density signal, rate limited as previously described. This signal is coupled to terminals 53 via resistors 280 and 281, resistor 281 chosen to have one-half the value of resistor 280, so that the output terminal 53 connected to resistor 280 has a times one multiplication factor, and the terminal 53 connected to resistor 281 has a times two multiplication factor. A resistor 285, of the same value as resistor 280, also couples the output to a terminal 286 of switch 91, allowing the optical density or absorbance signal to be coupled via concentration control 43 to the servoamplifier for direct read out.

RATE CIRCUIT 44 AND

CONCENTRATION CIRCUIT 43

To determine rate of chemical reaction, the optical density rate limited signal from the absorbance amplifier, composed of logarithmic converter 80 and rate-limiter 82, is directly time differentiated by differentiator 87. The optical density output from amplifier 232 is coupled through a resistor 300 and a 10-microfarad capacitor 302 to an electronic switch 304 which, in its deenergized state, connects capacitor 302 directly to the (−) input of an operational amplifier 306. The (+) input of the amplifier 306 is directly connected to ground 172. The output of the amplifier is connected through a resistor 310 to a resistor 312 which provides a times one multiplication factor for the rate signal to a terminal 313. The output is also connected to a resistor 315, one-quarter the value of resistor 312, which provides a times four multiplication factor for the rate signal to a terminal 316. Resistor 310 is also coupled to a feedback network for amplifier 306, consisting of a 10-megohm resistor 318 and a 0.056-microfarad capacitor 320, in parallel therewith, connected between resistor 31 and the (−) input of amplifier 306.

To provide a blank rate offset, the (−) input of amplifier 306 is also coupled through a 10-megohm resistor 322 to potentiometer 89, consisting of a 5-kilohm potentiometer resistance 324 connected in series with a 16-kilohm resistance 325 connected between +V, such as 15 volts DC and ground 172. Potentiometer 89 has a wiper 327 which may adjust across the resistance 324, in order to provide a blank rate offset.

In operation, operational amplifier 306 is connected as a differentiator, to differentiate the optical density signal in order to produce a rate of change signal at terminals 313 and 316. The rate of change may be offset by any selected amount of blank rate, as chosen by the position of wiper 327 of potentiometer 89. Electronic switch 304 is used to reset the input to the differentiator when switch 275 is actuated, and for this purpose may consist of any known type of electronic switch in which an input connection is normally connected through the switch, but is connected to ground for 100 milliseconds upon +V being connected to its control line 330. For this purpose, line 330 is connected to terminals 273 of switch 275, so that voltage applied thereto actuates electronic switch 304 upon actuation of switch 275. This terminates the input to the differentiator, and also grounds the output from the optical density circuit, while also discharging capacitor 302.

Concentration control 43 consists of a potentiometer resistance 335 connected between the switch 91 and ground 172. Wiper 92 of the potentiometer is movable across resistance 335 to select various relative multiplication factors for the signal being coupled via switch 93 and line 95 to the servoamplifier. The switch 91 is also coupled to a normally open, single-pole, single-throw switch 337 whose opposite terminal connects to ground 172. Switch 337 is contained within an electronic switch 340 which has a control or trigger line 341 connected to a terminal 343 on which the wiper of switch 275 normally rests. Electronic switch 340 may be of the known type that holds for 3 seconds upon disconnecting +V from trigger line 341, thereafter closing switch 337 in order to ground resistance 335. Thus, upon system reset by actuation of switch 275, electronic switch 340 first maintains the output to the servoamplifier, and then grounds the servoamplifier, via switch 93 and line 95, in preparation for accepting a new reading.

SERVOAMPLIFIER 50 AND

LOGIC NETWORK 155

Servoamplifier 50 and logic network 155 of FIG. 3 will now be described in detail. Differential amplifier 107 has a differential output on lines 109 and 110, and may be formed from any conventional unit, having an amplification factor of 100 or the like. For example, amplifier 107 may take the form of the differential amplifying portion of the servoamplifier in the before identified Plumpe system. When the signals on inputs 95 and 105 are equal, zero voltage output is developed on lines 109 and 110. When a difference exists in the input voltages, the amplified difference appears on lines 109 and 110. The difference signals are of equal absolute magnitude, but opposite polarity, the particular polarity depending on which signal at inputs 95 and 105 is of greater positive magnitude.

Stage 112 is connected to line 109 through a 200-kilohm resistor 350, which connects with the (−) input of an operational amplifier 352, the output of which is directly connected to the base electrode of an NPN-transistor 118. Line 109 is also coupled through a 10-kilohm resistor 354, a diode 355, and a 100-kilohm resistor 357 to the (+) input of operational amplifier 352. The junction between diode 355 and resistor 357 is coupled to wiper 159 through the parallel combination of a capacitor 360 and a 100-kilohm resistor 362.

Stage 114 is formed similar to stage 112, and hence line 110 is coupled through a 200-kilohm resistor 365 to a (−) input of an operational amplifier 367, the output of which is coupled to the base electrode of an NPN-transistor 122. Line 110 is also coupled through a 10-kilohm resistor 369, a diode 370, and a 100-kilohm resistor 372 to the (+) input of amplifier 367. The junction between diode 370 and resistor 372 is coupled to wiper 159 through the parallel combination of a capacitor 374 and a 100-kilohm resistor 376.

For controlling the direction of motion of armature 126, the collector and emitter electrodes of both transistors 118 and 122 are shunted across the shading coils 120 and 124, respectively. In operation, only one of the stages 112 or 114 is effective to forward bias its transistor 118 or 122 into saturation, to at all times short the associated shading coil, and cause the motor to rotate in a corresponding direction. Amplifiers 352 and 367 are connected as comparators, only one of which has a positive output to forward bias its associated transistor 118 or 122.

The combination of diode 355, capacitor 360, and resistor 354, and the corresponding combination of diode 370, capacitor 374 and resistor 369, in part determines the deadband and the speed that the servomechanism approaches null. These components are chosen to have values that match the mechanical characteristics of the servo, to achieve a critically damped response to a step input. They form a dynamic deadband compensation network, so for large error input signals which allow the servo to achieve rotational velocity inertia, the deadband of the system is widened. This will cause the servomechanism to brake sooner before reaching null, in order to prevent overshoot.

Wiper 159 of potentiometer 157 may be adjusted to vary statically the deadband of the system. Equal amounts of movement from the center position produce the same absolute magnitude of voltage on the wiper 159, which voltage is coupled through the dynamic deadband compensation networks to operational amplifiers 352 and 367.

When wiper 159 is moved onto resistance section 161, a positive voltage is coupled to the wiper and produces equal positive voltage outputs from operational amplifiers 352 and 367 when the system is at null. These outputs both forward bias transistors 118 and 122, thereby shorting both shading coils 120 and 124 at null, providing braking at null. When wiper 159 is moved onto resistance section 162, the negative voltage is coupled to both operational amplifiers, causing negative outputs which reverse bias transistors 118 and 122, and open shading coils 120 and 124 at null, so that no braking will occur when the system is at null. The magnitude of the positive or negative voltage, respectively, will control the relative amount of braking at null, or the point at which braking is terminated before reaching null.

Transistors 118 and 122 operate as AC switches which variably short the AC output of the shading coils 120 and 124, servomotor order to rotate the servomotor in the direction corresponding to the shorted shading coil. Depending on the bias to the transistors, they will pass both cycles of the AC waveform, then lesser amplitudes of one-half cycle of the AC, and finally lesser amplitudes of the remaining one-half cycle of the AC, until no waveform is passed by the transistor. When passing less than full wave AC, the circuit continuously controls the amount of braking by the opposite shading coil, and hence allows smooth speed control of the servomotor. For a more complete explanation of the operation of transistors connected as an AC switch, reference should be made to the before identified Plumpe system, or to the copending application of William H. Plumpe, Jr., entitled "Control Circuit," filed on Mar. 4, 1968, Ser. No. 710,100, and assigned to the same assignee as the present application.

Logic network 155 includes an NPN-transistor 390 whose emitter is directly coupled to ground 172, and whose collector is connected through a 200-ohm resistor 392 to output line 67 coupled to the triggering input of electronic switch 150. The base electrode of transistor 390 is coupled through a 10-kilohm resistor 395 to a pair of diodes 398 and 399. The anode of diode 398 is coupled to the output from operational amplifier 352, and the anode of diode 399 is coupled to the operational amplifier 367. Logic network 155 forms an AND circuit. When the servomechanism is at null and the deadband voltage is adjusted negative, by placing wiper 159 on resistance section 162, both operational amplifiers 352 and 367 have negative outputs. The two negative outputs are ANDed to cause transistor 390 to be reverse biased, removing ground from line 67 and actuating electronic switch 150, as will be explained in detail. This energizes electronic switch 150, to be explained in detail in FIG. 4, connecting energizing voltage across electromagnet 146 and thereby magnetically detenting indicator 55. Thus, as the servomechanism approaches null, the individual wheels of indicator 55 are detented to the nearest whole integer, automatically rounding off the fractional value to which the indicators may be driven by armature 126. The network 155 is designed so that the outputs from operational amplifiers 352 and 367 must both be negative in order to reverse bias transistor 390 to actuate the digit align.

When the servomechanism is at null and the deadband voltage is adjusted positive, by placing wiper 159 on resistance section 161, the outputs of operational amplifiers 352 and 367 are both positive at null, forward biasing transistor 390 and hence connecting line 67 to ground 172 through the low resistance of resistor 392. This prevents actuation of electronic switch 150, so there is no digit align at null, and indicators 55 are allowed to smoothly brake to any position, including a position between whole integers.

ELECTRONIC SWITCH 150 AND

MAGNETIC DIGIT ALIGN

Figure 4:
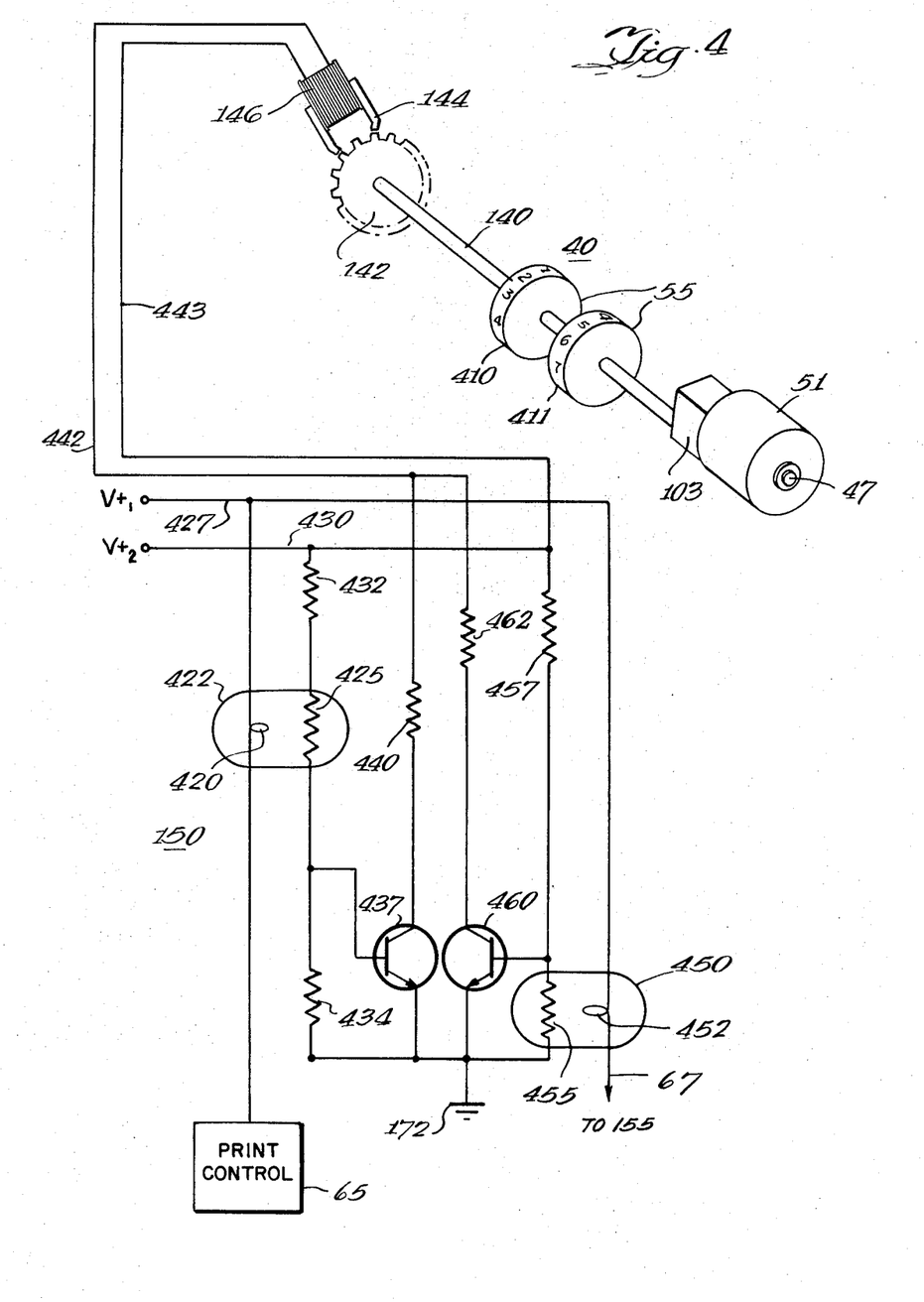
FIG. 4 is a partly schematic and partly diagrammatic representation of a portion of FIG. 3 showing in detail the means for producing discrete output readings from continuously variable input quantities.

In FIG. 4, electronic switch 150 which is actuated by removing ground from line 67, is illustrated in detail, in conjunction with a specific magnetic detent circuit for the visual indicator 55. While the magnetic detent disclosed in the before identified Plumpe et al. application Ser. No. 702,581, filed Feb. 2, 1968, entitled "Printing Apparatus," and assigned to the assignee of the present application, has been illustrated, other mechanical, electrical, or magnetic detenting mechanisms may be used in place thereof.

As described in the above Plumpe application, to which reference should be made for a more detailed explanation, indicator 55 consists of individual wheels, two labeled 410 and 411 being illustrated, interconnected by gearing means of the well known type so that 10 incremental advances of wheel 411 causes one incremental advance of wheel 410. Wheels 410, 411 are mounted on shaft 140 connected to the magnetizable toothed wheel 142, of soft iron or similar material. Adjacent wheel 142 is the electromagnet coil 146 which has a generally U-shaped magnetizable core 144 which terminates in free ends or poles adjacent a pair of the teeth on wheel 142. The radially outwardly projecting teeth of wheel 142 are preferably of the same width as the free ends of core 144, and the space between adjacent teeth of wheel 142 is preferably equal to the width of the teeth. Both the teeth and the free ends are preferably of flat-topped construction, in order to form sharp discontinuous corners at which the magnetic field will concentrate.

As also described in the above Plumpe application, after servomotor 51 has completed driving shaft 47 to a particular position, print control 65 energizes any suitable switch, such as electronic switch 150 (herein by grounding its output line, as will appear) to connect DC power across coil 146. This indices a magnetic field between the free ends of core 144. As the field seeks the path of least reluctance, the teeth of wheel 142 will move into alignment directly adjacent the free ends, thereby causing some displacement in shaft 140 to properly align or orient the wheels with respect to the reading and/or printing means associated therewith. Because the width of teeth of wheel 142 is preferably equal to the width of the airgap between adjacent teeth, the magnetic field will always cause the closest tooth to move into alignment with the free ends of core 144, thereby "rounding off" the servomechanism position which may cause wheel 411 to come to rest at a position in between whole integers carried thereon.

For controlling energization of electromagnet 146, print control 65 is connected to a filament 420 of a switching device 422, such as a "VACTEC," consisting of a light source or filament 420 located adjacent a light responsive resistance 425. One side of filament 420 is connected to print control 65, and the other side is connected to a source of DC filament potential 427, labeled V+$_1$. When the detent is to be actuated, print control 65 is effective to lower the line, connected to filament 420, to approximately ground potential, thereby connecting filament voltage across filament 420 and causing light energy to impinge on resistance 425. Since resistance 425 is completely encased within device 422, the impinging light energy results in lowering the resistance.

Resistance 425 is connected in a switching circuit between a second source of DC potential V+$_2$, on a line 430, and ground 172. This path includes a 10-kilohm resistor 432, resistance 425, and a 820-ohm resistor 434, connected in series between line 430 and ground 172. An NPN-transistor 437 has its base and emitter electrodes coupled across resistor 434. The collector electrode is connected through a 100-ohm resistor 440 to a line 442, which connects to one side of the electromagnet 146. The other side of the electromagnet coil, on a line 443, is connected directly to DC line 430. In operation, when filament 420 is energized, the resistance of resistor 425 decreases, causing an increased current flow which forward biases transistor 427, switching it into a conducting state which effectively connects ground to resistor 440. This completes a path to ground from DC line 430, through coil 146, thereby energizing the coil and causing the detent mechanism to be actuated.

For controlling electronic switch 150 by logic network 155 in accordance with the present invention, a second device 450, like device 422, is connected in the circuit. Line 67 is connected to a filament 452 of device 450, the other side of which connects directly with filament line 427. A light responsive resistor 455 in device 450 is connected in series with a 510-kilohm resistor 457 between line 430 and ground 72. An NPN-transistor 460 having its base and emitter electrodes shunted across resistor 455, has its collector connected through a 3-kilohm resistor 462 to line 442.

When logic network 155 disconnects line 67 from ground potential, the light energy which has been impinging resistor 455 ceases. This causes the resistance to increase, increasing the voltage drop across resistor 455 and forward biasing transistor 460. This in turn essentially connects ground to line 442, energizing the electromagnetic coil 146. The resistance values of the logic network portion of switch 150 are chosen so that the electromagnetic coil 146 is not connected across as great a potential difference as when the print control section of the electronic switch is energized. Thus, the magnetic detent is stronger when printing, than when the detent is automatically actuated by the servomechanism. This causes a smoother detent action when the indicators 55 are being driven by motor 51, insuring that wheels 55 travel to their proper location before being detented to the nearest whole integer.

We claim:

1. In a system including a spectrophotometer having transducer means for generating a signal proportional to the transmittance of a solution being analyzed, means for directly indicating the rate of chemical reaction of the solution, comprising:

conversion means coupled to said transducer means for generating a signal which is the logarithm of the transmittance proportional signal, including means for limiting the rate of change of at least one of said signals;

differentiator means coupled to said conversion means for differentiating the logarithm signal; and indicator means coupled to the differentiator means for producing an indication directly proportional to the differentiated signal, whereby said indication directly indicates the rate of chemical reaction of said solution.

2. The rate indicating means of claim 1 wherein said limiting means includes adjustment means for selecting different limits for the maximum rate of change of said at least one signal.

3. The rate indicating means of claim 2 wherein said adjustment means includes variable resistance means and means for varying the value of said variable resistance means, a plurality of diode elements, and circuit means interconnecting said plurality of diode elements and said variable resistance means to form said adjustment means.

4. The rate indicating means of claim 1 wherein said logarithm signal corresponds to the optical density of the solution, and second indicator means coupled to the conversion means for producing at the same time as the rate indication an indication directly proportional to the optical density of the solution.

5. The rate indicating means of claim 1 wherein said conversion means includes an amplifier, means connecting an input of said amplifier to said transducer means, a nonlinear element, and circuit means connecting said nonlinear element in a feedback path across said amplifier for generating said logarithm signal.

6. The rate indicating means of claim 5 wherein said nonlinear element comprises a device having a semiconductor junction using predominately minority carrier conduction.

7. The rate indicating means of claim 5 wherein said conversion means includes a second amplifier, a second nonlinear element, a source of fixed signal, means coupling said source to an input of said second amplifier, means connecting said second nonlinear element in a feedback path across said second amplifier, and means for subtracting the signal from said second amplifier from the signal from said first amplifier, for temperature compensating said conversion means.

8. The rate indicating means of claim 7 wherein said conversion means includes thermal conduction means in contact with both said first nonlinear element and said second nonlinear element for subjecting said nonlinear elements to the same changes in temperature.

9. In an analyzing system including transducer means for generating a transducer signal representative of a characteristic being analyzed, read out means for producing indications of quantities related to said characteristic, comprising:

calculating means coupled to said transducer means for selectively generating calculated signals corresponding to said related quantities;

servomechanism means for producing a mechanical movement directly related to a signal at a servoinput, said movement corresponding to said indications; and servoamplifier means coupled to said calculating means for translating the calculated signals to said servoinput, including translating means having a signal input, a signal output, and a bias input for controlling the translation of a signal from said signal input to said signal output, means connecting said signal input to said calculating means, means connecting said signal output to said servoinput, and selectable bias means coupled to said bias input for generating selectable values of bias which control the translation characteristics of said translational means, whereby selection of the bias adjusts the deadband of said servomechanism, wherein said translational means includes differential amplifying means generating a signal coupled to said signal output equal to the difference between the signals from said signal input and said bias input.

10. The read out means of claim 9 wherein said servoamplifier means includes dynamic deadband compensation means coupled to said translating means for varying the maximum rate of change of the signal at said signal output in response to changes in the rate of change of said calculated signals.

11. The read out means of claim 9 wherein said servoamplifier means includes logic means coupled to said translating means for generating an energizing signal as said servomechanism approaches the amount of mechanical movement corresponding to the calculated signal, read out means coupled to said servomechanism for producing indications directly proportional to said mechanical movement, and detent means for detenting the indication when said energizing signal is generated.

12. In an analyzing system including means for generating a signal having continuous variations representative of a characteristic being analyzed, read out means for producing incremental indications of the continuous variations, comprising:

servomechanism means coupled to said generating means for producing a continuous mechanical movement directly proportional to said signal from said generating means, said servomechanism having a null state for each different value of said signal from said generating means to cause different amount of mechanical movement;

read out means coupled to said servomechanism and having whole increment indications driven by the continuous mechanical movement, the indications occurring between whole increments for mechanical movement which does not correspond to a whole increment; and index means for aligning said read out means to whole increments, including means coupled to said servomechanism means for actuating said index means as said servomechanism approaches said null state, wherein said index means includes selectable means for disabling said actuating means, whereby said read out means produces incremental indications directly proportional to the continuous mechanical movements of said servomechanism means.

13. The read out means of claim 12 wherein said servomechanism means includes a servomotor, means for producing a rapid rate of change of mechanical movement for a first range of signals representing a first amount of movement necessary for said servomechanism to reach said null state, means for producing a slow rate of change of mechanical movement for a second range of signals representing a second amount of movement necessary for said servomechanism to move from said first movement to said null state, said actuating means being coupled to said slow means for actuating said index means as said servomechanism moves through said second range of signals and to continue actuation while said servomechanism is at said null state, said index means includes means for producing a first and a second detent torque for aligning said read out means, said first torque exceeding said second torque, said actuating means generating said second torque for aligning said read out means, and further means effective when said servomechanism is at said null state for producing said first torque to align said read out means.

* * * * *

PO-1050
(5/69)

UNITED STATES PATENT OFFICE
CERTIFICATE OF CORRECTION

Patent No. 3,633,012                    Dated  January 4, 1972

Inventor(s) Jack L. Wilhelmson and Bruce E. Michaels

It is certified that error appears in the above-identified patent and that said Letters Patent are hereby corrected as shown below:

In the ABSTRACT, line 8, the word "as" should be "an";

Column 11, line 35, the word "servomotor" (first occurrence) should be "in";

Column 12, following the heading "ELECTRONIC SWITCH 150 and MAGNETIC DIGIT ALIGN", in the third paragraph, lines 5 and 6, the word "indices" should be "induces"; and Column 14, claim 9, line 20, the word "translation" should be "translational".

Signed and sealed this 11th day of July 1972.

(SEAL)
Attest:

EDWARD M.FLETCHER,JR.          ROBERT GOTTSCHALK
Attesting Officer              Commissioner of Patents